United States Patent [19]
Charlton

[11] Patent Number: 5,301,166
[45] Date of Patent: Apr. 5, 1994

[54] REMOTE CONTROL COMMAND SYSTEM

[75] Inventor: John D. Charlton, Lancaster, Calif.

[73] Assignee: The United States of America as represented by the Secretary of the Navy, Washington, D.C.

[21] Appl. No.: 651,098

[22] Filed: Jun. 29, 1967

[51] Int. Cl.$^5$ .............................................. H04K 3/00
[52] U.S. Cl. ...................................... 367/1; 114/21.2
[58] Field of Search ................. 114/21, 23, 21.1, 21.2; 318/16; 340/171; 244/77 C, 3.11, 3.14; 367/1

[56] References Cited

U.S. PATENT DOCUMENTS

| 1,546,579 | 7/1925 | Hammond, Jr. | 367/135 |
| 2,396,091 | 3/1946 | DeBey | 318/16 |
| 2,413,066 | 12/1946 | Purington | 318/16 |
| 3,148,651 | 9/1964 | Ray | 114/21.1 |
| 3,212,054 | 10/1965 | Gardner | 367/96 |

Primary Examiner—Daniel T. Pihulic
Attorney, Agent, or Firm—Thomas E. McDonnell

[57] ABSTRACT

A remote control system protected against enemy takeover and particularly suited for the undersea control of acoustic decoys and torpedoes. System includes dual electronics systems. Command signal includes plurality of frequencies which disable one of dual systems and energizes the other system.

16 Claims, 2 Drawing Sheets

5,301,166

REMOTE CONTROL COMMAND SYSTEM

The invention described herein may be manufactured and used by or for the Government of the United States of America for governmental purposes without the payment of any royalties thereon or therefor.

BACKGROUND OF THE INVENTION

1. Field of the Invention

The present invention relates to a remote control command system and more particularly to a remote control system for various military devices which must be protected from enemy take-over.

2. Description of the Prior Art

Systems, using both electromagnetic and acoustic linking signals, have already been developed for the remote control of a wide variety of objects ranging from home TV sets and model airplanes to torpedoes, missiles and space equipment.

However, these previously developed systems have not been entirely satisfactory for military use because of the danger of enemy take-over either in the form of jamming signals or (a more remote but very serious possibility) by signals that actually control the military device for the enemy's purpose.

SUMMARY OF THE INVENTION

The general purpose of this invention is to provide a remote control system which embraces all of the advantages of prior remote control systems and that contains features which protect against enemy take-over. To attain this protection, the present invention contemplates the use of dual receiver systems which are responsive to different frequency ranges and command signals which include a plurality of frequencies. One of the signal frequencies disables one of the receiver systems and enables the other receiver system. The remainder of the signal frequencies energize the enabled receiver system to perform the commanded function.

It is, therefore, an object of the present invention to provide an improved remote control system that is protected against enemy take-over.

Another object is to provide an improved remote control system that is protected against enemy take-over and includes dual receiver systems.

A still further object is to provide an improved remote control system that is protected against enemy take-over and includes dual receiver systems and a multi-frequency command signal which disables one of the dual receiver systems and energizes the other.

DESCRIPTION OF THE DRAWINGS

Other objects and advantages of the invention will hereinafter become more fully apparent from the following description of the annexed drawings wherein.

DESCRIPTION OF THE INVENTION

The invention will be described, as initially contemplated, for use in underwater military devices, such as torpedoes and acoustic decays, where the command signal is acoustic in nature. However, it will be apparent that the invention is not limited to such underwater applications and can be used in many other environments, such as in the remote control of missiles, satellites, space equipment, etc. by means of an electromagnetic command link.

Figure 1:
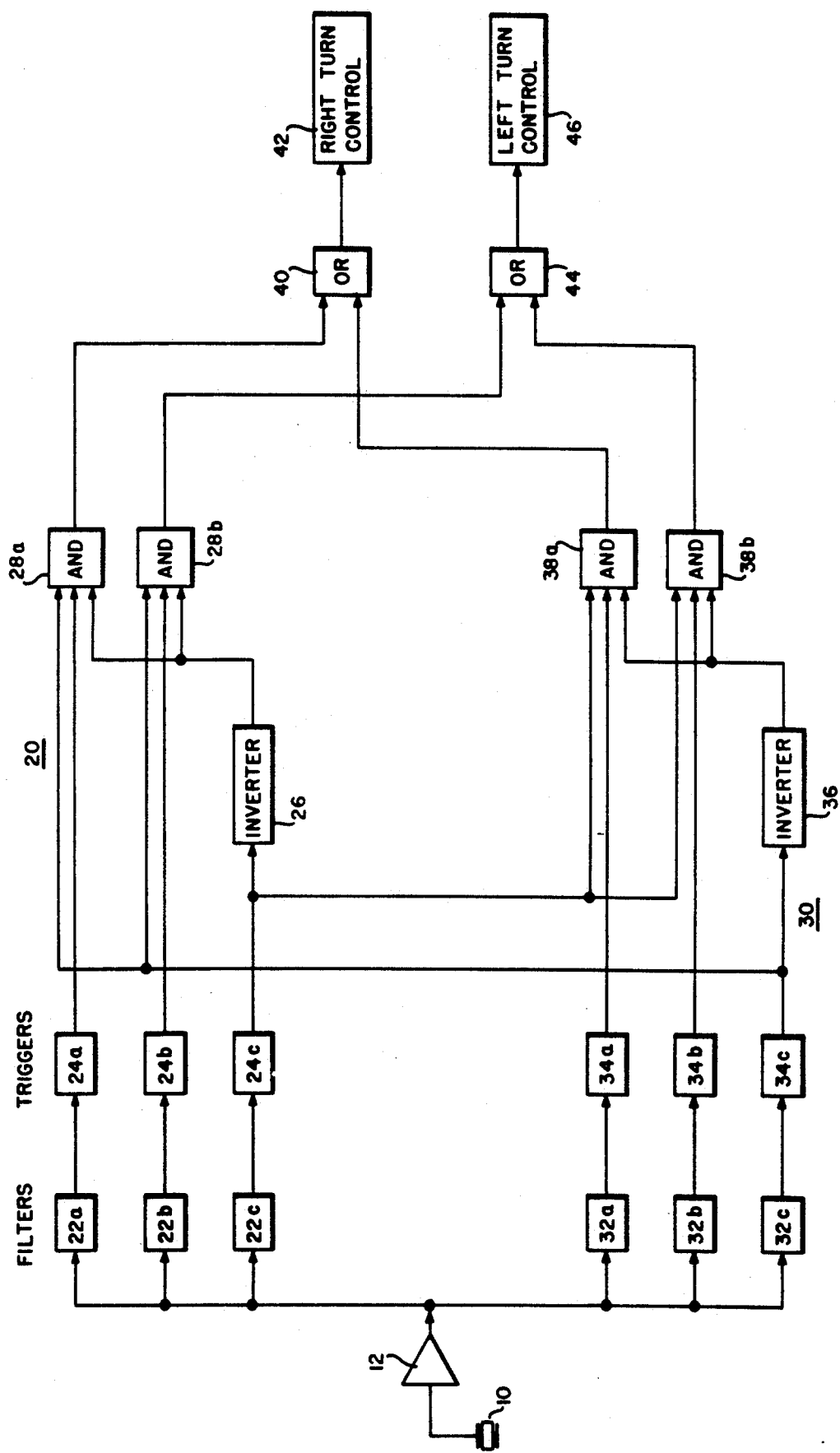
FIG. 1 illustrates a first embodiment of the invention as used in the control of a torpedo and FIG. 2 shows a second embodiment of the invention as used in the control of an acoustic decoy.

Referring now to the drawings, wherein like reference characters designate like or corresponding parts, there is shown in FIG. 1 an embodiment of the invention which is adapted to control a torpedo.

Most modern torpedoes have three stratum settings, usually designated as above limit (AL), below limit (BL) and no limit (NL). When set in AL, the torpedo is armed from the surface to a depth limit, usually 100 feet, and disarmed below this depth limit. When set in BL, the torpedo is disarmed from the surface to the depth limit and armed below this depth limit. When set in NL the torpedo is armed at all depths.

Several incidents wherein the torpedo has missed the target and then acquired and hit the launching ship have emphasized the need of a remote control system for torpedoes and have caused the avoidance, unless required by military necessity, of launching torpedoes which are armed in the same stratum as occupied by the launching ship. This practice obviously places a limitation on the efficient A use of torpedoes. The embodiment of the invention illustrated in FIG. 1 removes the need for stratum separation between the torpedo and the launching ship by providing the means whereby the path of the torpedo can be controlled from the launching ship.

Referring now to FIG. 1, the broad band acoustic transducer 10 is positioned on the torpedo in such a manner as to be energized by acoustic command signals propagated through the sea from the launching ship and produces electric signals which are amplified by the amplifier 12. Both the acoustic command signals and the resultant electric signals contain several different frequency components for purposes which will be discussed later. These frequency components are separated and passed into the dual receiver systems 20 and 30 by band pass filters 22a, b and c, 32a, b and c, all of which are connected to the output of amplifier 12. The pass bands of filters 22a, b and c are all different from each other and are lower in frequency than the pass bands of filters 32a, b and c, Which are also different from each other. An additional requirement is that not any of the filter pass bands be harmonically related to each other.

Each of the filters 22a, b and c, 32a, b and c are respectively connected to Schmitt trigger circuits 24a, b and c, 34a, b and c. The triggers 24c and 34c are in turn connected to inverter circuits 26 and 36 which function either to convert the trigger "high" state signals to low potential signals or to convert the trigger "low" state signals to high potential signals. As illustrated the AND gates 28a and 28b are respectively connected to receive the output signals of inverter 26, trigger 34c and triggers 24a or 24b. Similarly the AND gates 38a and 38b are respectively connected to receive the output signals of inverter 36, trigger 24c and triggers 34a or 34b. The AND gates 28a and b, 38a and b each function to produce a signal only when a high signal is received on all three inputs.

OR gate 40 is connected to receive any output signals from the AND gates 28a and 38a and, in turn, to energize the right turn control 42 which causes the torpedo to make a right turn. Similarly the OR gate 44 is connected to receive any output signals from the AND gates 28b and 38b and, in turn, to energize the left turn control 46 which causes the torpedo to make a left turn.

The operation of the embodiment of the invention illustrated in FIG. 1 will now be described in the environment of a torpedo although it will be apparent that this embodiment could also be located on and control other types of vehicles and that electromagnetic command signals could be used, where appropriate, rather than the described acoustic command signal.

For descriptive purposes, let it be assumed that it is desired to command a torpedo carrying the embodiment of FIG. 1 to make a right turn. To accomplish this result the command vessel propagates an acoustic command signal through the sea. This acoustic command signal is received and changed into an electric signal by the transducer 10. It will be realized, of course, that the acoustic and electric signals contain the same frequency components. These frequency components are chosen so that one component will pass through filter 22a and energize trigger 24a to produce a first high state signal input to AND gate 28a. The command signal also includes a frequency component which is in the pass band of filter 32c and which energizes trigger 34c to produce a second high state input signal to AND gate 28a. Inverter 36 converts the high state output of trigger 34c to a low state signal which disables the AND gates 38a and 38b. The command signal will not contain a frequency component in the pass band of filter 22c since trigger 24c must be maintained in the low state. This low state signal is converted by inverter 26 to a high state signal which constitutes the third high state input signal to AND gate 28a. The three high state input signals cause AND gate 28a to produce a signal which is applied through OR gate 40 to energize the right turn control 42 and thereby cause the torpedo to make a right turn.

Various reasons, such as an enemy jamming signal which energizes trigger 24c, may cause the torpedo not to respond to the command signal. As soon as this is apparent, the command signal can be changed to contain frequency components in the pass band of filters 22c and 32a and thereby cause AND gate 38a to energize the right turn control 42.

It is, of course, evident that left turns, if desired, can be commanded either by a command signal containing either frequency components in the pass bands of filters 22b and 32c, but not in 22c, or in the pass bands of filters 32b and 22c, but not in 32c.

Enemy countermeasures can be successful in disabling the embodiment of FIG. 1 only if jamming is present in A both of the regions of the spectrum in which the dual receivers 20 and 30 operate. Since these regions can be quite widely separated, the chance of successful jamming is minimized.

Because of the tremendous importance of submarine warfare, much effort is currently being directed toward developing sonar countermeasures for the purpose of protecting our submarines from sonar detection and attack by acoustic torpedoes, i.e. torpedoes which are guided to their target by sonar equipment carried in the torpedo. One of the most promising of these sonar countermeasures is the so-called acoustic decoy which is launched from the submarine and functions to propagate acoustic signals which cause search sonar or acoustic torpedoes to lock on (track) the acoustic decoy.

Figure 2:
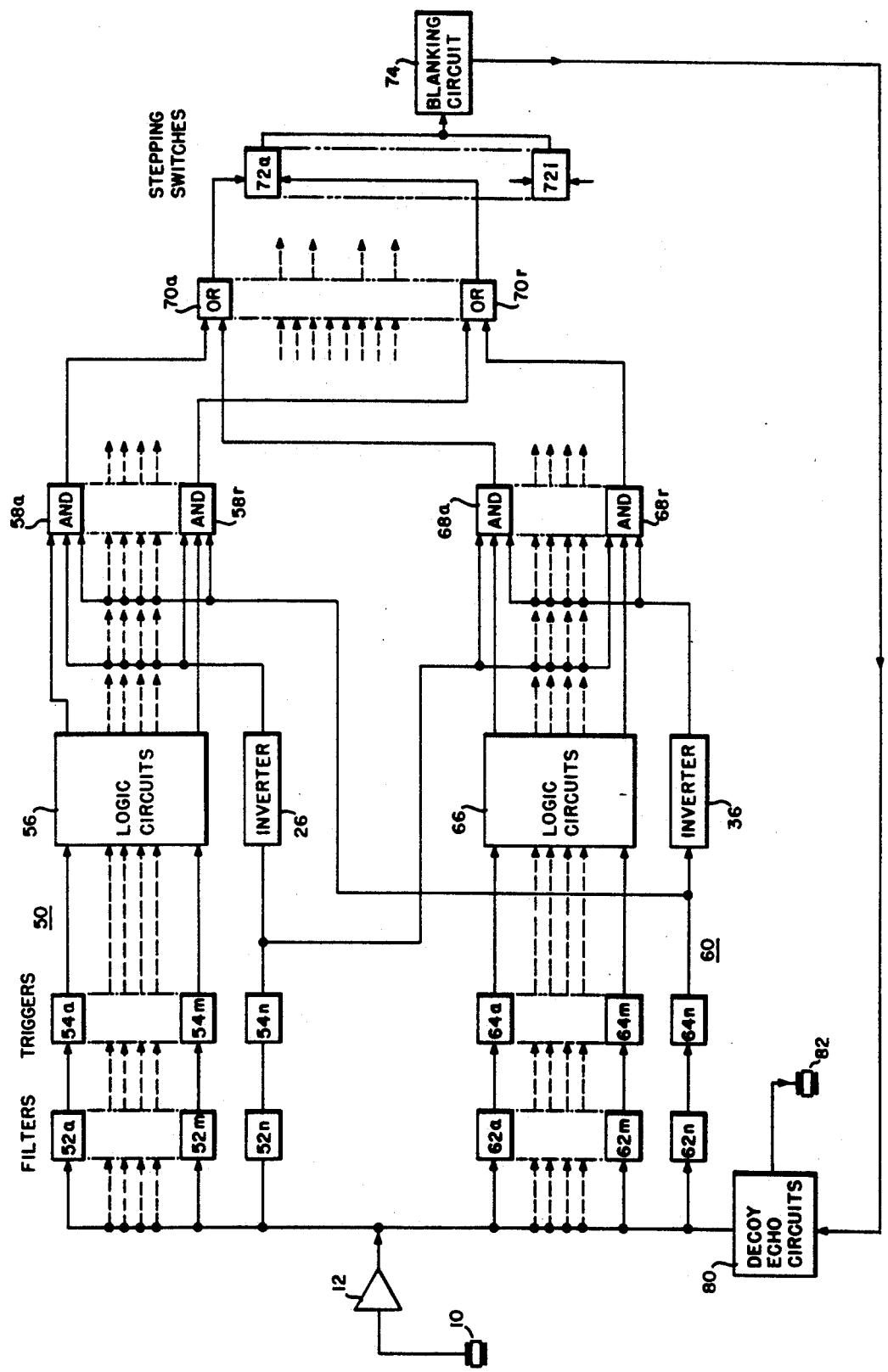

Referring now to FIG. 2, the broad band acoustic transducer 10 is positioned on the decoy in such a manner as to be energized by acoustic signals being propagated through the sea. These signals may be either the command signals from the command submarine or enemy sonar search signals or the guidance sonar signals of an enemy acoustic torpedo. Transducer 10 converts the received acoustic signals into electrical signal which are amplified by amplifier 12 and then applied to the dual receivers 50 and 60 and to the decoy electronics 80 which customarily, for the purpose of deceiving the enemy, propagate an "echo" of the received signal by means of the transducer 82.

The dual receivers 50 and 60 operate at different regions in the frequency spectrum, i.e. the pass bands of filters 52a ... n are much lower than the pass bands of filters 62a ... n. All of the pass bands are for different frequencies which are not harmonically related to each other. The filters 52a ... n and 62a ... n are individually connected to the output of amplifier 12 and are in turn connected to triggers 54a ... n and 64a ... n which are similar in function to the triggers 24a, b and c and 34a, b and c of the previously described embodiment of FIG. 1.

Triggers 54a ... m and 64a ... m are respectively connected to logic circuits 56 and 66 which are not, per se, a part of this invention. The logic circuits 56 and 66 function to provide a signal to a particular one of each set of AND gates 58a ... r and 68a ... r according to which combination of triggers 54a ... m and 64a ... m are energized to be in the high state. Many logic circuits, often in the form of a diode matrix, are known in the prior art and are suitable for use as the logic circuits 56 and 66. Triggers 54n and 64n are connected to inverters 26 and 36 which function, in a manner similar to that described in the embodiment of FIG. 1, to enable and disable the dual receivers 50 and 60.

The signal from the particular one of the AND gates 58a ... r, 68a ... r is applied through OR gates 70a ... r to energize one of the stepping switches 72a ... i to either increase or decrease a controlled function of the decoy. For purposes of example the switches 72a ... i may control in both directions the steering and aspect of the decoy and the doppler frequency shift and gain settings in the echo circuits 80 which produce the signal propagated by transducer 82.

Energization of any of the switches 72a ... i also energizes the blanking circuit 74 which functions to disable the echo circuits 80 and prevent the propagation, by transducer 82, of any "echoes" of the submarine command signal.

It is by now probably apparent that the operation of the embodiment of FIG. 2 is as follows. When the "pings" of search sonar or acoustic torpedo guidance sonar are received by transducer 10, "echoes" of these pings are produced and propagated by the circuit 80 and transducer 82 for the purpose of deceiving the enemy into believing his sonar signals have been reflected from a submarine. These "pings" will not energize the receivers 50 or 60 since the necessary presence and absence of frequency components will, almost of a certainty, not be present in the "ping".

The command signal from the submarine, by which some operational change in the decoy will be ordered, will contain a frequency component in the pass band of one, but not both, of the filters 52n or 62n. For purposes of illustration a frequency component in the pass band of filter 62n is assumed. The command signal will also include one or more frequency components in the pass bands of the filters in the other receiver, assumedly receiver 50, that is one or more frequency components in the pass bands of the filters 52a ... m. These frequency components will energize logic circuit 56 (by means of triggers 54a ... m) to produce and apply a signal to a particular AND gate 58a. This particular gate, and the others of the gates 58a . . . r, will also have enabling signals applied by inverter 26 and trigger 64n. All of the gates 68a . . . r will be disabled by inverter 36. The signal produced by the particular AND gate 58a . . . r energizes, through one of the OR gates 70a . . . r, one of the stepping switches 72a . . . i to thereby cause the desired change in the operation of the decoy. Energization of the stepping switch also causes blanking circuit 74 to disable echo circuits 80 and prevent the propagation of an echo signal (by transducer 82) as a result of the reception of the command signal.

Various reasons, such as an enemy jamming signal which energizes trigger 54n, may cause the decoy not to respond to the command signal. As soon as this is apparent, the command signal can be changed to contain frequency components in the pass bands of the filters 52n and 62a . . . m, but not 62n. Enemy countermeasures can be successful in disabling the embodiment of FIG. 2 only if jamming is present in both of the regions of the spectrum in which the dual receivers 50 and 60 operate. Since these regions can be quite widely separated, the chance of successful jamming by the enemy is minimized. However, in the event that the enemy is successful in jamming the pass bands of both filters 52n and 62n, the echo circuits 80 would continue to operate since the blanking circuit 74 would not be energized and consequently the decoy will continue to function and propagate "echo" signals as a result of the jamming signals received by transducer 10. These "echo" signals may deceive the enemy into believing that the jamming signals were reflected from a submarine.

There has been disclosed embodiments of an improved remote control system which are particularly adapted to use in torpedoes and acoustic decays and that are protected against enemy take-over and include dual receiver systems and utilize a multi-frequency command signal which disables one of the dual receiver systems and energizes the other. Obviously many other embodiments of the present invention, adapted to other environments, are possible in the light of the above teachings. It is therefore to be understood, that within the scope of the appended claims, the invention may be practiced otherwise than as specifically described.

What is claimed and desired to be secured by Letters Patent of the United States is:

1. A remote control system comprising:
   First and second receiving means, said first receiving means being connected to receive and be responsive to command signals in a first frequency region and said second receiving means being connected to receive and be responsive to command signals in a second frequency region which is separated from said first frequency region;
   Disabling means in each of said first and second receiving means, said disabling means being connected to receive and be responsive to command signals of particular frequencies in said first and second regions, each of said disabling means, when responsive to a command signal, functioning to disable one of said receiving means and enable the other of said receiving means and
   Control means connected to said first and second receiving means and energized by command signals in the frequency region to which said enabled one of said receiving means is responsive.

2. A remote control system as set forth in claim 1 wherein said first and second receiving means each includes a plurality of filters connected to receive said command signals, each of said filters having a pass band that is different from and not harmonically related to the pass bands of the others of said plurality of filters.

3. A remote control system as set forth in claim 2 wherein each of said receiving means further includes a plurality of trigger means individually connected to said plurality of filters.

4. A remote control system as set forth in claim 3 wherein each of said disabling means includes an inverter connected to the trigger means which is in turn connected to the filter having a pass band that includes one of said particular frequencies.

5. A remote control system as set forth in claim 4 wherein said first and second receiving means further each include a plurality of AND gates, the output of said AND gates being connected to said control means and wherein the input of each AND gate includes a first signal from the output of one of said inverters, a second signal from the input of the other of said inverters and a third signal resultant from the energization of at least one of said trigger means.

6. In combination with a torpedo, a remote control system comprising:
   Transducer means for receiving multi-frequency acoustic command signals and for producing similar multi-frequency electrical command signals;
   First and second receiving means, said first receiving means being connected to receive and be responsive to frequency components of said multi-frequency electrical command signals which are in a first frequency region and said second receiving means connected to receive and be responsive to frequency components of said multi-frequency electrical command signals which are in a second frequency region which is separated from said first frequency region;
   Disabling means in each of said first and second receiving means, said disabling means being connected to receive and be responsive to particular frequency components of said electrical command signals which are in said first and second regions, each of said disabling means, when responsive to a command signal, functioning to disable one of said receiving means and enable the other of said receiving means and
   Control means for varying the operative characteristics of said torpedo and connected to said first and second receiving means and energized by frequency components of said electrical command signals which are in the frequency region to which said enabled one of said receiving means is responsive.

7. The combination as set forth in claim 6 wherein said first and second receiving means each includes a plurality of filters connected to receive said multi-frequency electrical command signals, each of said filters having a pass band that is different from and not harmonically related to the pass bands of the others of said plurality of filters.

8. The combination as set forth in claim 7 wherein each of said receiving means further includes a plurality of trigger means individually connected to said plurality of filters.

9. The combination as set forth in claim 8 wherein each of said disabling means includes an inverter connected to the trigger means which is in turn connected to the filter having a pass band that includes one of said particular frequency components.

10. The combination as set forth in claim 9 wherein said first and second receiving means further each include a plurality of AND gates, the output of said AND gates being connected to said control means and wherein the input of each AND gate includes a first signal from the output of one of said inverters, a second signal from the input of the other of said inverters and a third signal resultant from the energization of at least one of said trigger means.

11. In combination with an acoustic decoy, a remote control system comprising:

Transducer means for receiving multi-frequency acoustic command signals and for producing similar multi-frequency electrical command signals;

Echo signal means connected to said transducer means for producing acoustic signals in response to said electrical command signals;

First and second receiving means, said first receiving means being connected to receive and be responsive to frequency components of said multi-frequency electrical command signals which are in a first frequency region and said second receiving means connected to receive and be responsive to frequency components of said multi-frequency electrical command signals which are in a second frequency region which is separated from said first frequency region;

Disabling means in each of said first and second receiving means, said disabling means being connected to receive and be respectively responsive to particular frequency components of said electrical command signals which are in said first and second regions to disable one of said receiving means and enable the other of said receiving means;

Control means for varying the operative characteristics of said echo signal means and of said decoy, said control means being connected to said first and second receiving means and energized by frequency components of said electrical command signals which are in the frequency region to which said enabled one of said receiving means is responsive and Blanking means connected to said control means and to said echo signal means to prevent said echo signal means from producing an acoustic signal when said control means are energized.

12. The combination as set forth in claim 11 wherein said first and second receiving means each includes a plurality of filters connected to received said multi-frequency electrical command signals, each of said filters having a pass band that is different from and not harmonically related to the pass bands of the others of said plurality of filters.

13. The combination as set forth in claim 12 wherein each of said receiving means further includes a plurality of trigger means individually connected to said plurality of filters.

14. The combination as set forth in claim 13 wherein each of said disabling means includes an inverter connected to the trigger means which is in turn connected to the filter having a pass band that includes one of said particular frequency components.

15. The combination as set forth in claim 14 wherein said first and second receiving means further each include a logic circuit which is connected to all of the trigger means in that receiving means except the trigger means which is connected to said inverter.

16. The combination as set forth in claim 15 wherein said first and second receiving means further each include a plurality of AND gates, the output of said AND gates being connected to said control means and wherein the input of each AND gate includes a first signal from the output of one of said inverters, a second signal from the input of the other of said inverters and a third signal from a connection to the output of said logic circuit.

* * * * *